(12) United States Patent
Osaka et al.

(10) Patent No.: US 8,077,398 B2
(45) Date of Patent: Dec. 13, 2011

(54) LENS DRIVING DEVICE COMPRISING MAGNETIC CIRCUIT WITH HIGH MAGNETIC EFFICIENCY

(75) Inventors: Tomohiko Osaka, Yamagata (JP); Kazunori Yokokura, Yamagata (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 213 days.

(21) Appl. No.: 12/498,557

(22) Filed: Jul. 7, 2009

(65) Prior Publication Data

US 2010/0002317 A1 Jan. 7, 2010

(30) Foreign Application Priority Data

Jul. 7, 2008 (JP) ................................. 2008-176447

(51) Int. Cl.
*G02B 15/14* (2006.01)
(52) U.S. Cl. ...................................................... 359/696
(58) Field of Classification Search .................. 359/694, 359/696, 704, 824
See application file for complete search history.

(56) References Cited

U.S. PATENT DOCUMENTS

2006/0028320 A1 2/2006 Osaka

FOREIGN PATENT DOCUMENTS

| CN | 101038361 A | | 9/2007 |
|---|---|---|---|
| JP | 2005-128392 A | | 5/2005 |
| JP | 2006-220775 A | | 8/2006 |
| JP | 2006-258969 A | | 9/2006 |
| JP | 2006-293243 A | | 10/2006 |
| JP | 2007-121853 | * | 5/2007 |
| JP | 2007-121853 A | | 5/2007 |
| JP | 2008-58659 A | | 3/2008 |

OTHER PUBLICATIONS

Extended European Search Report dated Sep. 10, 2009 (6 pages), issued in counterpart European Application No. 09164727.1.

* cited by examiner

*Primary Examiner* — Joseph P Martinez
(74) *Attorney, Agent, or Firm* — Holtz, Holtz, Goodman & Chick, PC (57) ABSTRACT

A lens driving device includes a lens holder including a tubular portion for holding a lens assembly, a driving coil fixed to the lens holder so as to position around the tubular portion, and a yoke including a permanent magnet opposite to the driving coil. The yoke includes an outer hollow cylindrical portion having a rectangular cylindrical shape, the permanent magnet includes at least four permanent magnet pieces each having a rectangular cross section. Four magnetic circuit auxiliary members are disposed between four corners of the outer hollow cylindrical portion of the yoke and four ones of the permanent magnet pieces that are disposed at the four corners of the outer hollow cylindrical portion of the yoke.

3 Claims, 6 Drawing Sheets

FIG. 6

LENS DRIVING DEVICE COMPRISING MAGNETIC CIRCUIT WITH HIGH MAGNETIC EFFICIENCY

This application is based upon and claims the benefit of priority from Japanese Patent Application JP 2008-176447, filed on Jul. 7, 2008, the disclosure of which is incorporated herein in its entirety by reference.

BACKGROUND OF THE INVENTION

This invention relates to a lens driving device and, in particular, to an autofocus lens driving device for use in a portable compact camera.

The portable compact camera is mounted in a camera-equipped cellular mobile phone. The portable compact camera is provided with the autofocus lens driving device. Previously, various autofocus lens driving devices have been proposed.

By way of illustration, Japanese Unexamined Patent Application Publication No. 2005-128392 (JP-A-2005-128392) (which will be also called a first patent document) discloses a lens driving device which is excellent in shock resistance. The lens driving device disclosed in the first patent document comprises a substantially cylindrical shaped yoke, a base in which the yoke is mounted, a lens supporting body (a lens holder) disposed in the yoke at an inner side thereof, and a pair of leaf springs mounted on the lens supporting body. The pair of leaf springs is called a front-side spring and a rear-side spring. The front-side spring is disposed to the lens supporting body at a front side (one side) in a direction of an optical direction of a lens therein while the rear-side spring is disposed to the lens supporting body at a rear side (another side) in the direction of the optical direction of the lens therein. The yoke has a substantially U-shape in cross section. A magnet (a permanent magnet) is disposed in the interior of the U-shape and a coil is disposed in the interior of the U-shape at an inner side of the magnet. The magnet is fixed to the base via a rear spacer. The coil is fixed to an outer portion of the lens supporting body. The outer portion of the lens supporting body is inserted in the interior of the yoke. Thereby, the outer portion of the lens supporting body moves in a gap in the U-shape of the yoke. The yoke is fixed to the base at an inner side. The rear-side spring has an outer end portion which is fixed between a base portion of the base and a rear spacer.

In the lens driving device disclosed in the first patent document, the lens supporting body has a substantially cylindrical shape and has an interior in which a lens (a lens assembly, a lens barrel) is accommodated. The lens supporting body is movably mounted at the inner side of the yoke along the optical direction. The front-side spring comprises a substantially ring-shaped leaf spring which comprises an inner end portion and an outer end portion. The inner end portion of the front-side spring is sandwiched between the lens supporting body and a cap to be fixed. The front spacer is inserted between the outer end portion of the front-side spring and the yoke. The rear-side spring has a substantially same shape to that of the front-side spring and comprises a substantially ring-shaped leaf spring. The rear-side spring has an inner end portion which is fixed to a rear end of the lens supporting body. The rear-side spring has an outer end portion which is fixed between the base portion of the base and the rear spacer.

In the lens driving device disclosed in the first patent document, the coil has a cylindrical shape and the magnet also has a cylindrical shape. Specifically, the magnet comprises four magnet pieces each having an arc shape and has a cylindrical shape as a whole.

In addition, Japanese Unexamined Patent Application Publication No. 2006-293243 (JP-A-2006-293243) (which will be also called a second patent document) discloses a lens driving device which is capable of smoothly driving a lens and also accurately turning the optical axis direction of the lens to a photographing direction even when a camera is used with the photographing direction inclined to a vertical direction. The lens driving device disclosed in the second patent document comprises a holder (a lens holder) holding a lens, a ring-shaped driving coil mounted to the holder, a magnetic field generating arrangement disposed in a fixed member side and applying a radial driving magnetic field to the coil, a first spring member (a front-side spring) coupling an upper side of the holder with an upper side of the fixed member, and a second spring member (a rear-side spring) coupling a lower side of the holder with a lower side of the fixed member. Herein, in the manner which is similar to the above-mentioned first patent document, the front-side spring has an inner end portion which is sandwiched between the lens holder and a cap to be fixed.

In the second patent document, the magnetic field generating arrangement comprises a combination of a cylindrical-shaped magnet disposed to an outer side of the ring-shaped coil and a U-shaped cylindrical yoke consisting of a magnetic substance such as soft-iron.

Furthermore, Japanese Unexamined Patent Application Publication No. 2006-258969 (JP-A 2006-258969) (which will be also called a third patent document) discloses a camera-equipped cellular mobile phone which is capable of shorting a time required for automatic focusing. The camera-equipped cellular mobile phone (a lens driving device) disclosed in the third patent document a holder (a lens holder) including a tubular portion having an end to which the lens (the lens assembly, the lens barrel) is mounted, a driving coil fixed to the holder (the lens holder) so as to position around the tubular portion of the holder, a yoke comprising a permanent magnet opposite to the driving coil, a pair of leaf springs disposed to both sides of the tubular portion of the holder (the lens holder) in the direction of the optical axis. The pair of leaf springs supports the holder (the lens holder) in the direction of the optical axis shiftably so as to position the holder (the lens holder) in a radial direction. By energizing the driving coil, it is possible to positionally adjust the lens (the lens assembly) in the direction of the optical axis according to interaction between a magnetic field of the permanent magnet and a magnetic field due to an electric current flowing through the driving coil. In the pair of leaf springs, the one is called an upper leaf spring (a front-side spring), the other is called a lower leaf spring (a rear-side spring). The upper leaf spring (the front-side spring) has an inner end portion which is sandwiched between an upper end (a front end) of the holder and a stopper to be fitted to the holder (the lens holder).

In the third patent document, the driving coil has a cylindrical shape and a plurality of permanent magnets are disposed to an inner surface of an outer tubular portion of the yoke with a space left between the driving coil and it. Each of the permanent magnets has an arc shape.

Inasmuch as, in each of structures disclosed in the above-mentioned first through third patent documents, the driving coil has the cylindrical shape, the magnet (the permanent magnet) has the cylindrical shape (the arc shape). However, it is difficult to manufacture such a magnet (permanent magnet) having the cylindrical shape (the arc shape) and the magnet (the permanent magnet) is expensive. As a result, it is disadvantageous in that the lens driving device is also expensive.

In addition, Japanese Unexamined Patent Application Publication No. 2007-121853 (JP-A-2007-121853) (which will be also called a fourth patent document) discloses an image pickup apparatus in which thickness of a magnet in a direction orthogonal to an optical axis of an image pickup lens is different according to positions in a circumferential direction. In the fourth patent document, as modification of an embodiment, the magnet comprises four first divided portions each having a first thickness and having a rectangular shape in a cross section in a plane orthogonal to the optical direction and four second divided portions each having a second thickness and having a rectangular shape in a plane orthogonal to the optical direction that are alternately disposed in a circumferential direction. The first thickness is thicker than the second thickness.

The fourth patent document uses, as the permanent magnet, a substantially flat shape one. However, inasmuch as a magnetic circuit in the fourth patent document comprises the magnets and the yoke alone, it is disadvantageous in that magnetic efficiency thereof is low.

SUMMARY OF THE INVENTION

It is therefore an exemplary object of the present invention to provide a cheap lens driving device.

It is another exemplary object of the present invention to provide a lens driving device comprising a magnetic circuit which has a high magnetic efficiency.

Other objects of this invention will become clear as the description proceeds.

On describing the gist of an exemplary aspect of this invention, it is possible to be understood that a lens driving device comprises a lens holder including a tubular portion for holding a lens assembly, a driving coil fixed to the lens holder so as to position around the tubular portion, a yoke comprising a permanent magnet opposite to the driving coil, and upper and lower leaf springs disposed both sides of the tubular portion of the lens holder in the direction of the optical axis. The upper and lower leaf springs support the lens holder in the direction of the optical axis shiftably so as to position the lens holder in a radial direction. Each of the upper and lower leaf springs comprises an inner end portion mounted to the lens holder and an outer end portion mounted to the yoke. The lens holder is positionally adjustable to the direction of the optical axis, by energizing the driving coil, according to interaction between a magnetic field of the permanent magnet and a magnetic field due to a current flowing through the driving coil. According to the exemplary aspect of this invention, the yoke includes an outer hollow cylindrical portion having a rectangular cylindrical shape and the permanent magnet comprises at least four permanent magnet pieces each having a rectangular cross section. The lens driving device comprises four magnetic circuit auxiliary members which are disposed between four corners of the outer hollow cylindrical portion of the yoke and four ones of the permanent magnet pieces that are disposed at the four corners of the outer hollow cylindrical portion of the yoke.

DESCRIPTION OF THE EXEMPLARY EMBODIMENTS

Figure 1:
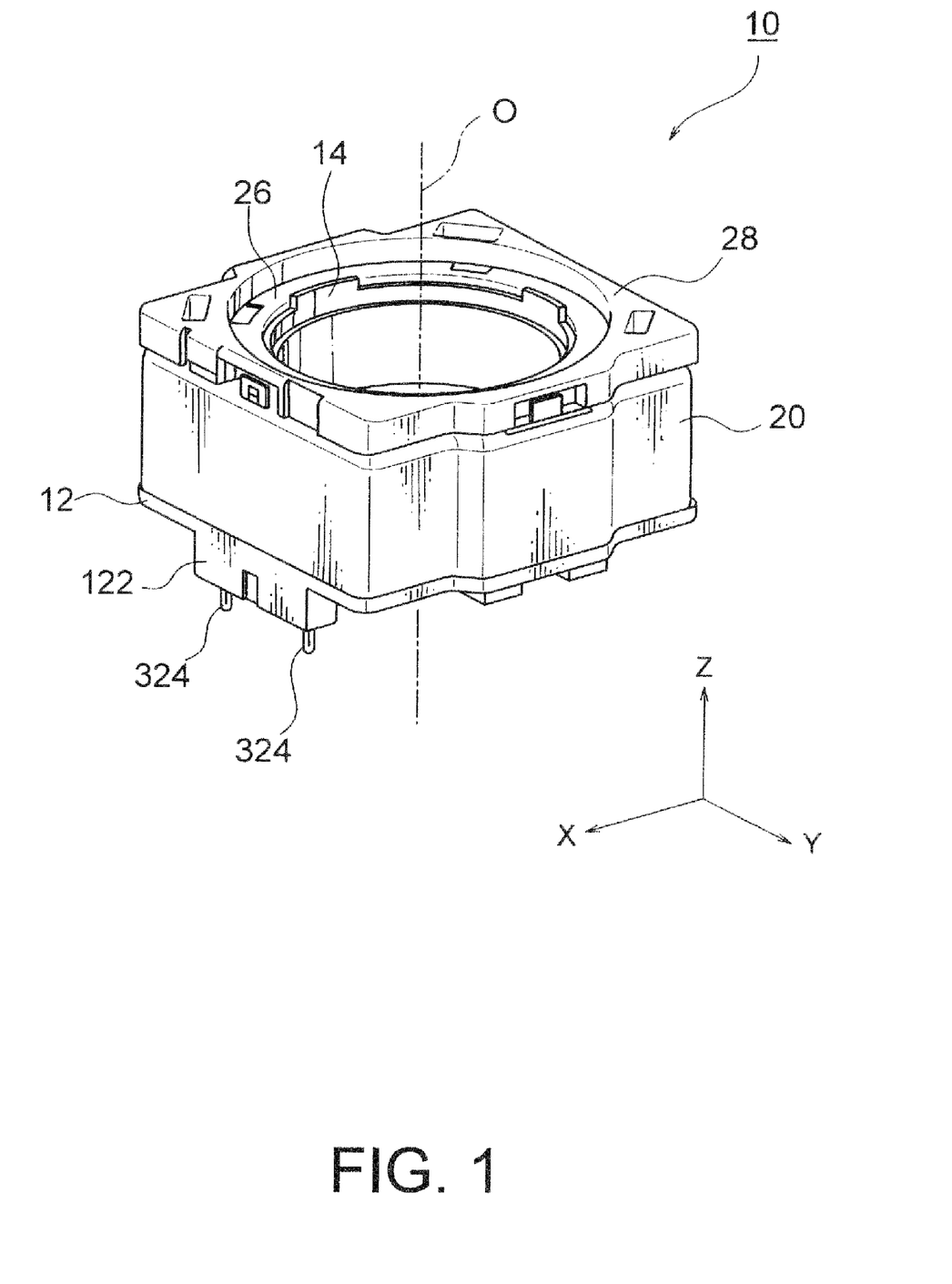
FIG. 1 is a perspective view of a lens driving device according to a first exemplary embodiment of the present invention.
Figure 2:
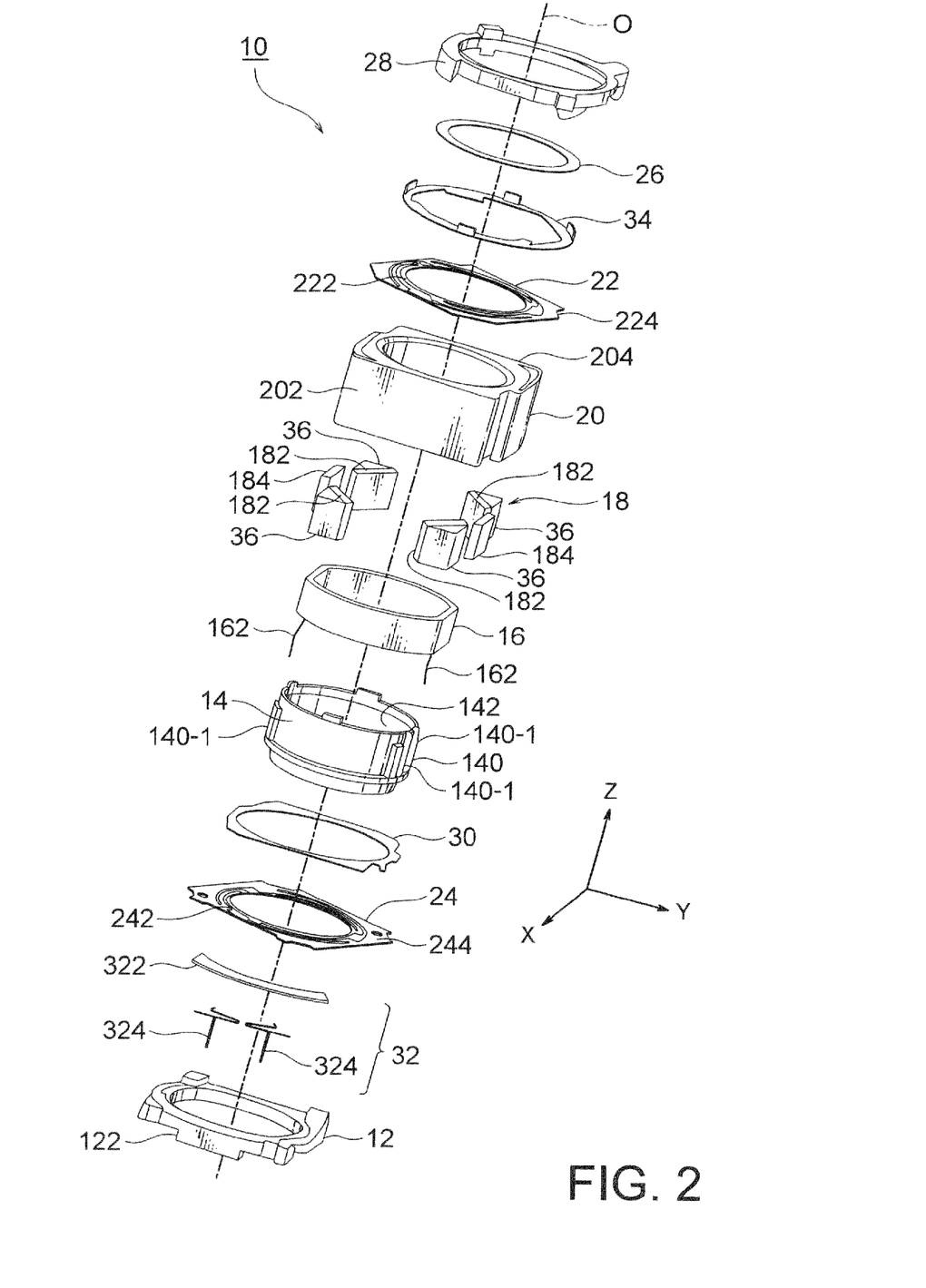
FIG. 2 is an exploded perspective view of the lens driving device illustrated in FIG. 1.

Referring to FIGS. 1 and 2, the description will proceed to a lens driving device 10 according to a first exemplary embodiment of this invention, FIG. 1 is a perspective view of the lens driving device 10. FIG. 2 is an exploded perspective view of the lens driving device 10.

Herein, in the manner shown in FIGS. 1 and 2, an orthogonal coordinate system (X, Y. Z) is used. In a state illustrated in FIGS. 1 and 2, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIGS. 1 and 2, the up-and-down direction Z is a direction of an optical axis O of a lens.

However, in an actual use situation, the direction of the optical axis O, namely, the Z-axis direction becomes a fore-and-aft direction. In other words, an upper direction of the Z-axis becomes a front direction while a lower direction of the Z-axis becomes a rear direction.

The illustrated lens driving device 10 is mounted to a camera-equipped cellular mobile phone which is enable to automatic focusing. The lens driving device 10 is for moving a lens assembly (a lens barrel) (not shown) in the direction of the optical axis O. The lens driving device 10 comprises an actuator base 12 which is disposed in a lower side (a rear side) in the Z-axis direction (the direction of the optical axis O). Although illustration is not made, the actuator base 12 has a lower portion (a rear portion) on which an image pickup device disposed on a module board is mounted. The image pickup device picks up a subject image formed by the lens assembly to convert it into an electric signal. The image pickup device may, for example, comprise a CCD (charge coupled device) type image sensor, a CMOS (complementary metal oxide semiconductor) type image sensor, or the like. Accordingly, a camera module comprises a combination of the lens driving device 10, the module board, and the image pickup device.

The lens driving device 10 comprises a lens holder 14 including a tubular portion 140 for holding the lens assembly (the lens barrel), a driving coil 16 fixed to the lens holder 14 so as to position around the tubular portion 140 thereof, a yoke 20 comprising a permanent magnet 18 opposite to the driving coil 16, a pair of leaf springs 22 and 24 disposed to both sides of the tubular portion 140 of the lens holder 14 in the direction of the optical axis O. The pair of leaf springs 22 and 24 supports the lens holder 14 in the direction of the optical axis O shiftably so as to position the lens holder 14 in a radial direction. In the pair of leaf springs 22 and 24, the one leaf spring 22 is called an upper leaf spring, another leaf spring 24 is called a lower leaf spring.

In addition, in the manner which is described above, in the actual use situation, the upper direction in the Z-axis direction (the direction of the optical axis O) becomes the front direction while the lower direction in the Z-axis direction (the direction of the optical axis O) becomes the rear direction. Accordingly, the upper leaf spring 22 is also called a front-side spring while the lower leaf spring 24 is also called a rear-side spring.

As shown in FIG. 2, the yoke 20 has a rectangular cylindrical shape. Specifically, the yoke 20 comprises an outer hollow cylindrical portion 202 having the rectangular cylindrical shape and a rectangular ring-shaped end portion 204 disposed on an upper end (a front end) of the outer hollow cylindrical portion 202.

Accordingly, the driving coil 16 also has a substantially rectangular cylindrical shape matched with a shape of the rectangular cylindrical-shaped yoke 20. The tubular portion 140 of the lens holder 14 has four contact portions 140-1 which project outwards in a radial direction at a position corresponding to four corners of the driving coil 16. To the four contact portions 140-1, the driving coil 16 is bonded at the four corners thereof. That is, the driving coil 16 is bonded to the tubular portion 140 at the four contact portions 140-1 thereof.

Figure 3:
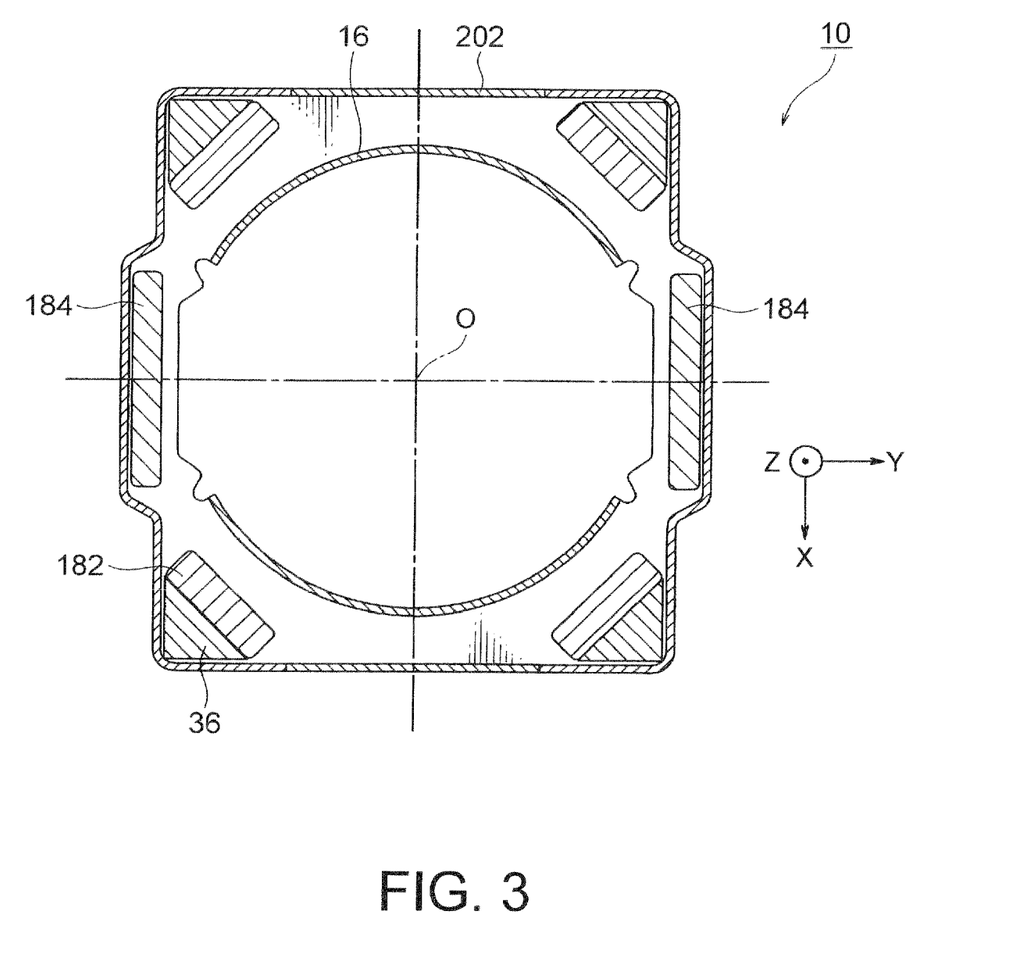
FIG. 3 is a transverse cross section showing a first example of a magnetic circuit for use in the lens driving device illustrated in FIG. 1.

Referring to FIG. 3 in addition to FIG. 2, the description will proceed to a magnetic circuit for generating a magnetic field toward the driving coil 16. FIG. 3 is a transverse cross section showing a first example of the magnetic circuit for use in the lens driving device 10.

The illustrated magnetic circuit comprises the yoke 16, the permanent magnet 18, and four magnetic circuit auxiliary members 36 according to a first example of the present invention.

The permanent magnet 18 comprises four first rectangular-shaped permanent magnet pieces 182 and two second rectangular-shaped permanent magnet pieces 184. The four first rectangular-shaped permanent magnet pieces 182 are disposed to the outer hollow cylindrical portion 202 of the yoke 20 at four corners thereof. The two second rectangular-shaped permanent magnet pieces 184 faces two opposite surfaces of the driving coil 16. That is, the permanent magnet 18 comprises in total six permanent magnet pieces 182, 184 which are disposed to the rectangular cylindrical-shaped outer hollow cylindrical portion 202 of the yoke 20 at the four corners and two sides thereof.

The four magnetic circuit auxiliary members 36 are disposed between the four first rectangular-shaped permanent magnet pieces 182 and the four corners of the outer hollow cylindrical portion 202 of the yoke 20. Each of the four magnetic circuit auxiliary members 36 is made of a ferromagnetic material such as iron. In the example being illustrated, each of the four magnetic circuit auxiliary members 36 has a triangular shape in cross section in a plane orthogonal to the direction of the optical axis O. That is, each magnetic circuit auxiliary member 36 has a triangular pillar shape. The illustrated magnetic circuit auxiliary member 36 is manufactured by press working.

In the manner which is described above, the permanent magnet 18 according to the first exemplary embodiment of this invention six rectangular-shaped permanent magnet pieces 182 and 184. Accordingly, it is possible to easily manufacture each permanent magnet piece 182, 184 by press molding, As a result, the permanent magnet 18 becomes cheap.

On the other hand, each magnetic circuit auxiliary member 36 is made of material different from that of the permanent magnet 18 and is made of the ferromagnetic material which is cheap and is easily worked. It is possible to easily work each magnetic circuit auxiliary member 36 by pressing it. In addition, different from the permanent magnet 18, accuracy in shape is not required to each magnetic circuit auxiliary member 36. Accordingly, each magnetic circuit auxiliary member 36 is cheap.

In addition, inasmuch as the magnetic circuit comprises not only the yoke 16 and the permanent magnet 18 but also the four magnetic circuit auxiliary member 36, it is possible to improve magnetic efficiency thereof.

Although each magnetic circuit auxiliary member 36 has a triangular shape in cross section in the first example of the magnetic circuit illustrated in FIG. 3, the shape of the magnetic circuit auxiliary member is not restricted to it and various shapes may be used thereto in the manner which will later be described in conjunction with other examples of the magnetic circuit.

At any rate, the permanent magnet 18 is disposed with a space between it and the driving coil 16.

The upper leaf spring (the front-side spring) 22 is disposed at an upper side (a front side) of the lens holder 14 in the direction of the optical axis O while the lower leaf spring (the rear-side spring) 24 is disposed at a lower side (a rear side) of the lens holder 14 in the direction of the optical axis O. The upper leaf spring (the front-side spring) 22 and the lower leaf spring (the rear-side spring) 24 have the substantially same structure.

More specifically, the upper leaf spring (the front-side spring) 22 comprises an inner end portion 222 mounted on the lens holder 14 and an outer end portion 224 mounted on the yoke 20. Between the inner end portion 222 and the outer end portion 224, three arm portions are provided. Each arm portion connects the inner end portion 222 to the outer end portion 224.

Likewise, the lower leaf spring (the rear-side spring) 24 comprises an inner end portion 242 mounted on the lens holder 14 and an outer end portion 244 mounted on the yoke 20. Between the inner end portion 242 and the outer end portion 244, three arm portions are provided. Each arm portion connects the inner end portion 242 to the outer end portion 244.

The inner end portion is also called an inner ring while the outer end portion is also called an outer ring.

In addition, the inner end portion 222 of the upper leaf spring (the front-side spring) 22 is sandwiched between the lens holder 14 and a stopper 26 to be fixed to them. In other words, the stopper 26 is fitted to the lens holder 14 so as to sandwich the inner end portion 222 of the upper leaf spring (the front-side spring) 22 between it and the lens holder 14. On the other hand, the outer end portion 224 of the upper leaf spring (the front-side spring) 22 is sandwiched between the yoke 20 and a cover 28 to be fixed to them. In addition, between the outer end portion 224 of the upper leaf spring (the front-side spring) 22 and a cover 28, a ring-shaped plate 34 is disposed.

The stopper 26 has functions as follows. That is, the stopper 26 has a function for bringing the inner end portion 222 of the upper leaf spring (the front-side spring) 22 into intimate contact with the lens holder 14 without variations and with very high precision. It is therefore possible to improve variations in a VCM (voice coil motor) characteristic. In addition, the stopper 26 has a function for improving the adherability of the upper leaf spring (the front-side spring) 22. Accordingly, the lens driving device 10 has an improved impact-resistance. Furthermore, the stopper 26 has a function for preventing deformation of the upper leaf spring (the front-side spring) 22 on a drop impact of the lens driving device 10. Accordingly, the lens driving device 10 has also the improved impact-resistance. The stopper 26 has a function for determining a mechanical stroke of the lens driving device 10.

On the other hand, the outer end portion 244 of the lower leaf spring (the rear-side spring) 24 is fixed to the yoke 20 through a spacer 30. In other words, the spacer 30 and the outer end portion 244 of the lower leaf spring (the rear-side spring) 24 are sandwiched between the yoke 20 and the actuator base 12 to be fixed to them. The inner end portion 242 of the lower leaf spring (the rear-side spring) 24 is fixed to the lens holder 14 at a lower end (a rear end) side thereof.

The tubular portion 140 of the lens holder 14 has an inner wall in which a female screw thread 142 is cut. On the other hand, although the illustration is not made, the lens assembly (the lens barrel) has an outer wall in which a male screw thread screwed in the above-mentioned female screw thread 142 is cut. In a case of fitting the lens assembly (the lens barrel) to the lens holder 14, it includes the steps of rotating the lens assembly (the lens barrel) with respect to the tubular portion 140 of the lens holder 14 around the optical axis O to screw it along the direction of the optical axis O thereby accommodating the lens assembly (the lens barrel) in the lens holder 14, and of connecting them to each other via an adhesive agent or the like.

By energizing the driving coil 16, it is possible to positionally adjust the lens holder 14 (the lens assembly) in the direction of the optical axis O according to interaction between a magnetic field of the permanent magnet 18 and a magnetic field due to an electric current flowing through the driving coil 16.

A power supplying member 32 is disposed between the lower leaf spring (the rear-side spring) 24 and the actuator base 12. The power supplying member 32 is for supplying the driving coil 16 with power.

The illustrated power supplying member 32 comprises a flexible printed circuit 322 and a pair of sheet-metal terminals 324 having elasticity. The flexible printed circuit 322 is sandwiched between the lower leaf spring 24 and the actuator base 12 and is electrically connected to a pair of leads 162 of the driving coil 16. The pair of sheet-metal terminals 324 extends downwards from the flexible printed circuit 322 up to the above-mentioned module board.

Figure 4:
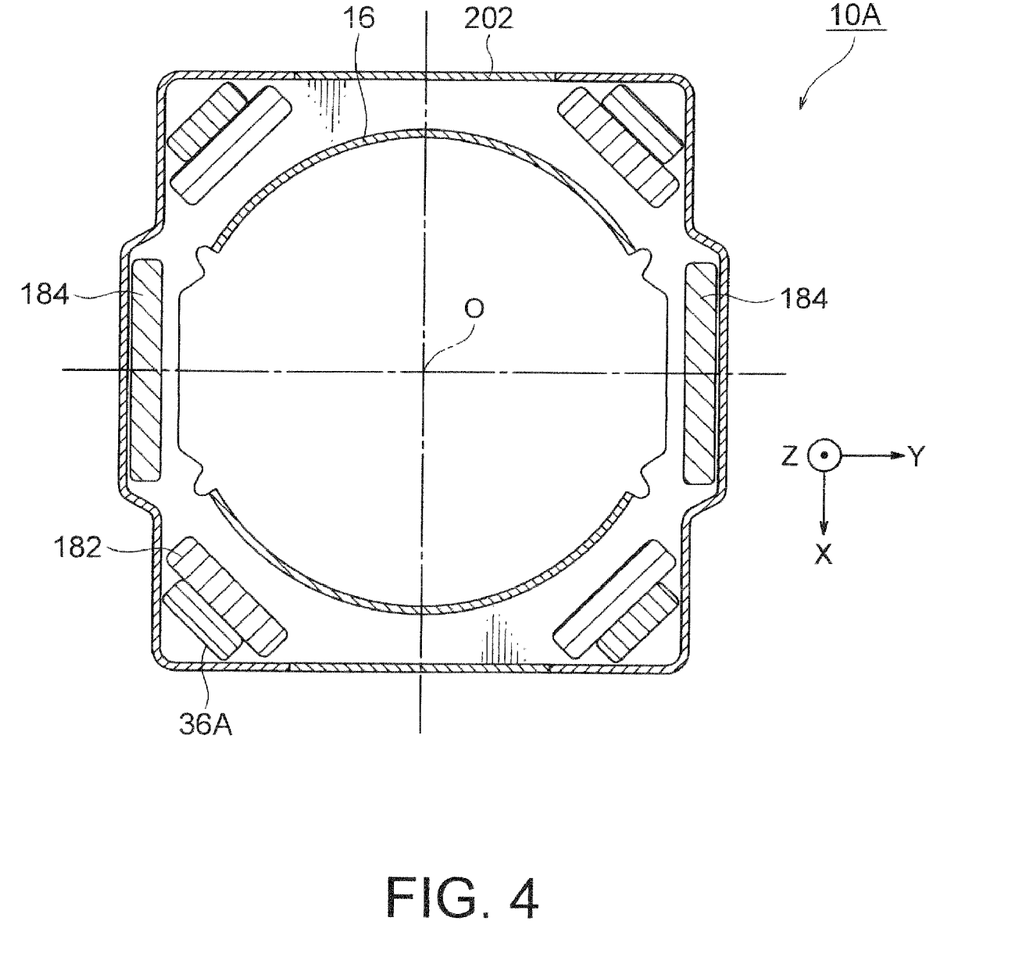
FIG. 4 is a transverse cross section showing a second example of a magnetic circuit for use in a lens driving device according to a second exemplary embodiment of the present invention.

Referring to FIG. 4, the description will proceed to a second example of the magnetic circuit for use in a lens driving device 10A according to a second exemplary embodiment of the present invention. FIG. 4 is a transverse cross section showing the second example of the magnetic circuit for use in the lens driving device 10A. The illustrated magnetic circuit is similar in structure to the magnetic circuit illustrated in FIG. 3 except that structure of the four magnetic circuit auxiliary members are modified from those illustrated in FIG. 3 as will later become clear. The four magnetic auxiliary members are therefore depicted at 36A. The same reference symbols are attached to those having similar structure to those illustrated in FIG. 3, differences alone will later be described for the sake of simplification of description.

The four magnetic circuit auxiliary members 36A are disposed between the four first rectangular-shaped permanent magnet pieces 182 and the four corners of the outer hollow cylindrical portion 202 of the yoke 20. Each of the four magnetic circuit auxiliary members 36A is made of a ferromagnetic material such as iron. In the example being illustrated, each of the four magnetic circuit auxiliary members 36A has a rectangular shape in cross section in a plane orthogonal to the direction of the optical axis O. That is, each magnetic circuit auxiliary member 36A has a rectangular pillar shape. The illustrated magnetic circuit auxiliary member 36A is manufactured by press working.

Each magnetic circuit auxiliary member 36A is made of material different from that of the permanent magnet 18 and is made of the ferromagnetic material which is cheap and is easily worked, it is possible to easily work each magnetic circuit auxiliary member 36A by pressing it. In addition, different from the permanent magnet 18, accuracy in shape is not required to each magnetic circuit auxiliary member 36A. Accordingly, each magnetic circuit auxiliary member 36A is cheap.

In addition inasmuch as the magnetic circuit comprises not only the yoke 16 and the permanent magnet 18 but also the four magnetic circuit auxiliary members 36A, it is possible to improve magnetic efficiency thereof.

Figure 5:
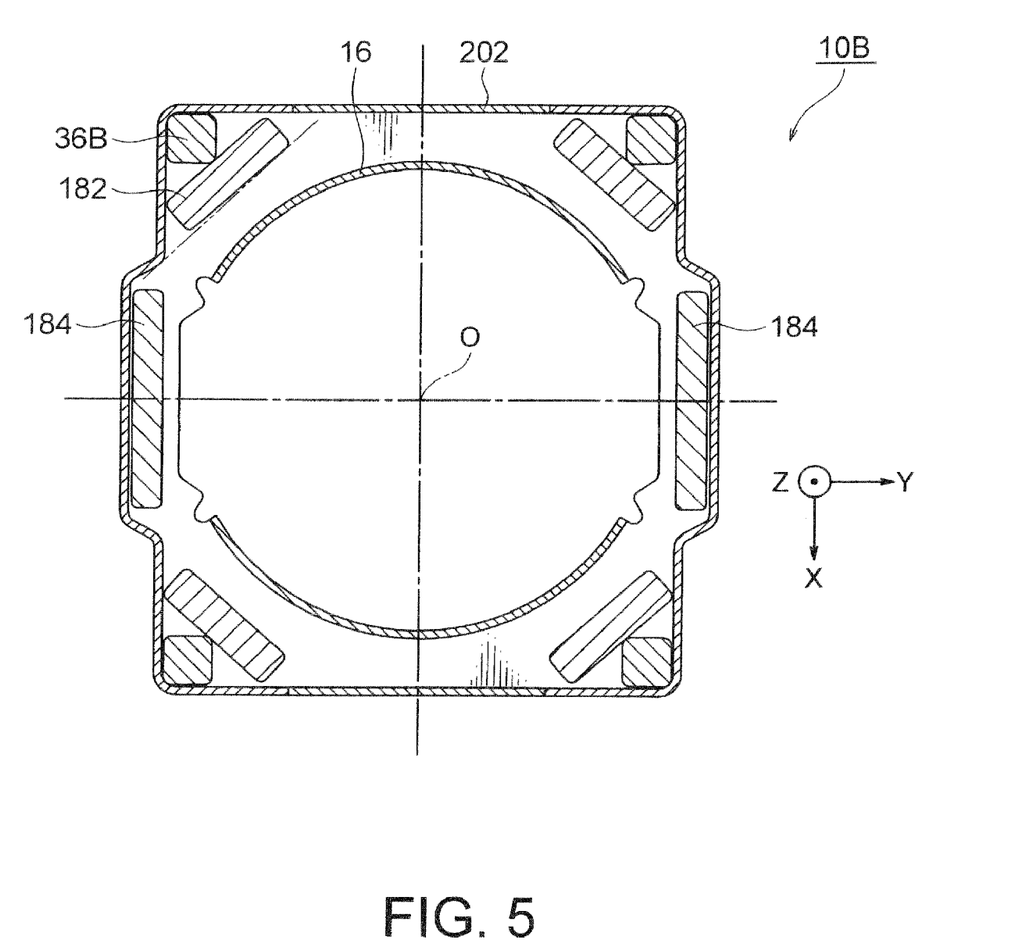
FIG. 5 is a transverse cross section showing a third example of a magnetic circuit for use in a lens driving device according to a third exemplary embodiment of the present invention.

Referring to FIG. 5, the description will proceed to a third example of the magnetic circuit for use in a lens driving device 10B according to a third exemplary embodiment of the present invention. FIG. 5 is a transverse cross section showing the third example of the magnetic circuit for use in the lens driving device 10B. The illustrated magnetic circuit is similar in structure to the magnetic circuit illustrated in FIG. 3 except that structure of the four magnetic circuit auxiliary members are modified from those illustrated in FIG. 3 as will later become clear. The four magnetic auxiliary members are therefore depicted at 36B. The same reference symbols are attached to those having similar structure to those illustrated in FIG. 3, differences alone will later be described for the sake of simplification of description.

The four magnetic circuit auxiliary members 36B are disposed between the four first rectangular-shaped permanent magnet pieces 182 and the four corners of the outer hollow cylindrical portion 202 of the yoke 20. Each of the four magnetic circuit auxiliary members 36B is made of a ferromagnetic material such as iron. In the example being illustrated, each of the four magnetic circuit auxiliary members 36B has a square shape in cross section in a plane orthogonal to the direction of the optical axis O. That is, each magnetic circuit auxiliary member 36B has a square pillar shape. The illustrated magnetic circuit auxiliary member 36B is manufactured by press working.

Each magnetic circuit auxiliary member 36B is made of material different from that of the permanent magnet 18 and is made of the ferromagnetic material which is cheap and is easily worked. It is possible to easily work each magnetic circuit auxiliary member 36B by pressing it. In addition, different from the permanent magnet 18, accuracy in shape is not required to each magnetic circuit auxiliary member 36B. Accordingly, each magnetic circuit auxiliary member 36B is cheap.

In addition, inasmuch as the magnetic circuit comprises not only the yoke 16 and the permanent magnet 18 but also the four magnetic circuit auxiliary members 36B, it is possible to improve magnetic efficiency thereof.

Figure 6:
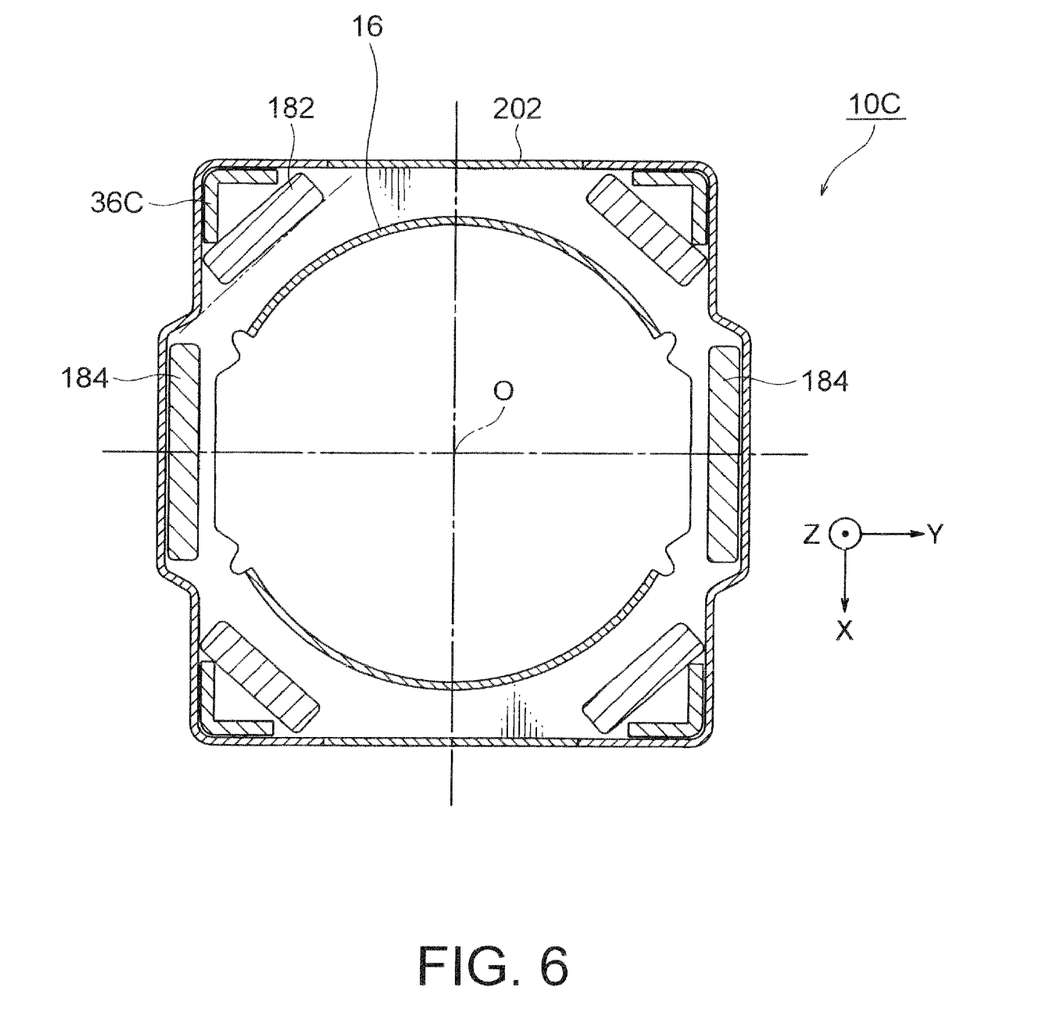
FIG. 6 is a transverse cross section showing a fourth example of a magnetic circuit for use in a lens driving device according to a fourth exemplary embodiment of the present invention.

Referring to FIG. 6, the description will proceed to a fourth example of the magnetic circuit for use in a lens driving device 10C according to a fourth exemplary embodiment of the present invention. FIG. 6 is a transverse cross section showing the fourth example of the magnetic circuit for use in the lens driving device 10C. The illustrated magnetic circuit is similar in structure to the magnetic circuit illustrated in FIG. 3 except that structure of the four magnetic circuit auxiliary members are modified from those illustrated in FIG. 3 as will later become clear. The four magnetic auxiliary members are therefore depicted at 36C. The same reference symbols are attached to those having similar structure to those illustrated in FIG. 3, differences alone will later be described for the sake of simplification of description.

The four magnetic circuit auxiliary members 36C are disposed between the four first rectangular-shaped permanent magnet pieces 182 and the four corners of the outer hollow cylindrical portion 202 of the yoke 20. Each of the four magnetic circuit auxiliary members 36C is made of a ferromagnetic material such as iron. In the example being illustrated, each of the four magnetic circuit auxiliary members 36C has an L shape in cross section in a plane orthogonal to the direction of the optical axis O. The illustrated magnetic circuit auxiliary member 36C is manufactured by press working.

Each magnetic circuit auxiliary member 36C is made of material different from that of the permanent magnet 18 and is made of the ferromagnetic material which is cheap and is easily worked. It is possible to easily work each magnetic circuit auxiliary member 36C by pressing it. In addition, different from the permanent magnet 18, accuracy in shape is not required to each magnetic circuit auxiliary member 36C. Accordingly, each magnetic circuit auxiliary member 36C is cheap.

In addition, inasmuch as the magnetic circuit comprises not only the yoke 16 and the permanent magnet 18 but also the four magnetic circuit auxiliary members 36C, it is possible to improve magnetic efficiency thereof.

In the lens driving device according to the exemplary aspect of this invention, each of the four magnetic circuit auxiliary members may be, for example, made of a ferromagnetic material. Each of the four magnetic circuit auxiliary members preferably may have a triangular shape in cross section in a plane orthogonal to the direction of the optical axis. Each of the four magnetic circuit auxiliary members may be made of a pressed metal.

An exemplary advantage according to the invention is that it is possible to provide the cheap lens driving device comprising the magnetic circuit having high magnetic efficiency because the yoke includes the outer hollow cylindrical portion having the rectangular cylindrical shape, the permanent magnet comprises at least four permanent magnet pieces each having a rectangular cross section, and four magnetic circuit auxiliary members are disposed between four corners of the outer hollow cylindrical portion of the yoke and four ones of the permanent magnet pieces that are disposed at the four corners of the outer hollow cylindrical portion of the yoke.

While this invention has been particularly shown and described with reference to the exemplary embodiment thereof, the invention is not limited to the embodiment. It will be understood by those of ordinary skill in the art that various changes in form and details may be therein without departing from the spirit and scope of the present invention as defined by the claims.

What is claimed is:

1. A lens driving device comprising:
a lens holder including a tubular portion for holding a lens assembly;
a driving coil fixed to said lens holder so as to be positioned around the tubular portion;
a yoke comprising a permanent magnet disposed opposite to said driving coil; and
upper and lower leaf springs disposed respectively on upper and lower sides of the tubular portion of said lens holder in a direction of an optical axis, said upper and lower leaf springs supporting said lens holder in the direction of the optical axis shiftably so as to position said lens holder in a radial direction,
wherein each of said upper and lower leaf springs comprises an inner end portion mounted to said lens holder and an outer end portion mounted to said yoke, whereby said lens holder is positionally adjustable in the direction of the optical axis, by energizing said driving coil, according to interaction between a magnetic field of said permanent magnet and a magnetic field due to a current flowing through said driving coil,
wherein said yoke includes an outer hollow cylindrical portion having a rectangular cylindrical shape,
wherein said permanent magnet comprises at least four permanent magnet pieces each having a rectangular cross section,
wherein said lens driving device further comprises four magnetic circuit auxiliary members each of which is made of a ferromagnetic material and which are disposed between four corners of said outer hollow cylindrical portion of said yoke and four of said permanent magnet pieces that are disposed at the four corners of said outer hollow cylindrical portion of said yoke.

2. The lens driving device as claimed in claim 1, wherein each of said four magnetic circuit auxiliary members has a triangular shape in cross section in a plane orthogonal to the direction of the optical axis.

3. The lens driving device as claimed in claim 1, wherein each of said four magnetic circuit auxiliary members is made of a pressed metal.

* * * * *